US010066151B2

(12) United States Patent
Song et al.

(10) Patent No.: US 10,066,151 B2
(45) Date of Patent: *Sep. 4, 2018

(54) METHOD FOR A FRACTURING FLUID SYSTEM AT HIGH TEMPERATURES

(71) Applicant: CNPC USA Corporation, Houston, TX (US)

(72) Inventors: Lulu Song, Sugar Land, TX (US); Zhenzhou Yang, Beijing (CN)

(73) Assignee: CNPC USA Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,766

(22) Filed: Apr. 9, 2018

(65) Prior Publication Data
US 2018/0223174 A1 Aug. 9, 2018

Related U.S. Application Data

(63) Continuation of application No. 14/945,084, filed on Nov. 18, 2015, now Pat. No. 9,963,630.

(51) Int. Cl.
E21B 43/267 (2006.01)
C09K 8/68 (2006.01)
C09K 8/88 (2006.01)

(52) U.S. Cl.
CPC ............. C09K 8/685 (2013.01); C09K 8/885 (2013.01); C09K 8/887 (2013.01); E21B 43/267 (2013.01); C09K 2208/26 (2013.01)

(58) Field of Classification Search
CPC ........ C09K 8/685; C09K 8/885; E21B 43/267
USPC ..................................................... 166/308.5
See application file for complete search history.

(56) References Cited

U.S. PATENT DOCUMENTS

| 4,752,404 A | 6/1988 | Burns et al. |
| 2011/0067875 A1 | 3/2011 | Funkhouser et al. |
| 2012/0006551 A1 | 1/2012 | Carman et al. |

OTHER PUBLICATIONS

Non-Final Office Action dated Sep. 22, 2016, in U.S. Appl. No. 14/945,084.
Non-Final Office Action dated Jan. 27, 2017, in U.S. Appl. No. 14/945,084.
Final Office Action dated Jun. 5, 2017, in U.S. Appl. No. 14/945,084.

(Continued)

Primary Examiner — William D Hutton, Jr.
Assistant Examiner — Ashish K Varma
(74) Attorney, Agent, or Firm — Ramey & Schwaller, LLP

(57) ABSTRACT

The method for well-stimulation through a wellbore in a rock formation is hydraulic fracturing under high temperature conditions. The method includes injecting a fracturing fluid system to the rock formation; fracturing the rock formation at a temperature between 150-260 degrees Celsius; and recovering fluid components of the fracturing fluid system from the wellbore and setting the proppant in the fractures. The fracturing fluid system includes proppant and a plurality of fluid components. The fluid components can include water, a gelling agent, and a stabilizer made of ascorbic acid. The ascorbic acid stabilizes viscosity of the gelling agent, adjusts pH, and delays cross linking. Amount of components and additional components, such as a cross-linking agent, a breaker, another adjusting agent and an inverting surfactant adjust the fracturing fluid system for well conditions and a type of treatment to be completed.

11 Claims, 4 Drawing Sheets

(56) References Cited

OTHER PUBLICATIONS

Non-Final Office Action dated Oct. 11, 2017, in U.S. Appl. No. 14/945,084.
Notice of Allowance dated Feb. 15, 2018, in U.S. Appl. No. 14/945,084.

— Vis (17.5gpt UltraGel HT, 15ppt ascorbic acid, 3gpt XL1, 230C_100s-1)
---- Vis (17.5gpt UltraGel HT, 20ppt ascorbic acid, 3gpt XL1, 230C_100s-1)
—  Sample Temp (230C)

— Vis (20gpt UltraGel HT, 11ppt ascorbic acid, 3gpt XL1, with SHS 1350s-1 for 5min)
—  Sample Temp (200C)

METHOD FOR A FRACTURING FLUID SYSTEM AT HIGH TEMPERATURES

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to fluid systems in the oil and gas industry, in particular, a fracturing fluid system. In particular, the present invention relates to a fracturing fluid system with ascorbic acid for high temperatures. More particularly, the present invention relates to a fracturing fluid system with ascorbic acid for stable viscosity at temperatures between 150-260 degrees Celsius.

2. Description of Related Art Including Information Disclosed Under 37 CFR 1.97 and 37 CFR 1.98

Fluid systems transport materials and chemicals and perform work, such as powering downhole tools with hydraulics, during drilling and production operations for oil and gas. Drilling mud is the lubricant and transport material during drilling. The drilling mud fluid is pumped from the surface to the wellbore with coolants and stabilizers to provide relief to the mechanical tools in the extremely hot and pressurized environmental conditions at the drill bit. The pulverized rock at the drill bit is suspended in the drilling mud and pumped back out of the borehole for removal. Fracturing fluid systems are the fluids pumped into the wellbore with a proppant in order to fracture a rock formation. A high pressure injection of fracturing fluid system at a target depth creates cracks in rock formation, and the fracturing fluid system enters these cracks. The proppant, such as sand or other particulates, prevent the cracks from closing when the pressured injection of fluid stops. The fracture is held open by the proppant so that the formation remains permeable by oil, gas, salt water, and other fluids, which can now be pumped through the well.

Fracturing fluid systems are comprised of water, proppant, and additives. The additives control rheological properties of the fracturing fluid system so as to allow the transport of proppant for different formations under various conditions. High viscosity fracturing relies on gelling agents, such as guar gum, to increase viscosity and suspend the proppant for delivery as far as possible into the cracks of the fracture. High rate or high velocity relies on low friction and fast pumping fracturing fluid systems to reach deeper into a rock formation. Additives can be principally chosen for a desired ability to suspend proppant or to be pumped at a particular velocity.

Additives can also be selected for recovery of the fracturing fluid system. Once the proppant is delivered, the fluid components of the fracturing fluid system must be removed. Additional water can be pumped to flush the fracture. During the fluid injection, additives can be released into the fracturing fluid system to alter the gelling agent, so as to reduce viscosity and more easily release the proppant from suspension. The fracturing fluid system waste contains the water and additives, which can contaminate the environment. With so much water being used, the amount of produced wastewater with additives is also great. There is a risk to ground water, when fracturing fluid system is injected and recovered, and there is a risk to surface water, when produced wastewater is stored in waste pits and retention ponds. Additives can be chosen to be more biologically friendly in order to lessen environmental impact.

Fracturing fluid systems fail, when the proppant is not delivered or not anchored in the fracture. The viscosity may be too high or the velocity is too slow, so that the proppant cannot reach deep enough into the cracks in the formation. The viscosity may be too low or the velocity too fast, so that the proppant is not suspending in the fluid component long enough to reach deep into cracks. Also, when the fluid component washes out of the fracture, the proppant must remain in the fracture, separate from the liquid components of the fracturing fluid system. If the fracturing fluid system remains too viscous, the washing out may dislodge and carry proppant back out of the fracture.

With advances in the drilling to greater depths, the high temperature conditions at the greater depths cause conventional fracturing fluid systems to fail. Fracturing fluid systems with gelling agents lose stability and cannot hold viscosity to suspend the proppant into the formation. The prior art discloses fracturing fluid systems with selected additives to account for these high temperature conditions.

U.S. Pat. No. 8,022,015, issued to Paul S. Carman et al. on 20 Sep. 2011, discloses a method of fracturing with a phenothiazine stabilizer. Well treatment fluids and methods of treating high temperature subterranean formations of up to about 260 degrees C. are disclosed. The additives of the fracturing fluid include a gelling agent, a high molecular weight synthetic copolymer, a phenothiazine stabilizer, and a pH adjusting agent that maintains a pH in a range of about 4.5 to about 5.25 for the fluids. The phenothiazine stabilizer is an electron donating compound, which maintains viscosity of the gel by slowing hydrolysis of the fracturing fluid system at temperatures above 148.9 degrees C. The method also requires a suitable crosslinking agent for the getting agent and a high molecular weight synthetic polymer to maintain viscosity at the high temperatures.

U.S. Pat. No. 8,691,734, issued to Paul S. Carman et al. on 8 Apr. 2014, also discloses a method of fracturing with a phenothiazine stabilizer. Foaming affects the amount of water and viscosity of the fracturing fluid system. This method includes a foaming agent, instead of a gelling agent, as an additive to reduce the amount of water required for the fracturing fluid system.

Phenothiazine is a known insecticide and treatment for worms in livestock and humans. Derivatives of phenothiazine have been used in antipsychotic drugs. Phenothiazine is not biologically friendly, and there is an elevated risk to the environment with potential insecticides contaminating ground water. Furthermore, phenothiazine is not soluble in water, but the fracturing fluid system is more than 90% water. More solvents are required to dissolve phenothiazine in the fracturing fluid system. The use of a foaming agent, instead of a gelling agent, further reduces the amount of water, but more solvents are still needed to accommodate these high temperature fracturing fluid systems.

Advancement in drilling technology has not always permitted oil and gas production at certain depths with extreme environmental conditions of temperature and pressure. The prior art discloses other additives for fracturing fluid systems, although these prior art references do not address high temperature conditions. Other additives to regulate stability of the fracturing fluid system under more conventional conditions include various cross linking agents and stabilizers. Ascorbic acid is one such known additive.

The inherent properties of ascorbic acid, as an acid and as a stabilizer, are known in the prior art. Ascorbic acid is a known additive in drilling fluids because of these inherent properties. For example, United States Publication No. 20150175877, published for Shindgikar et al. on 25 Jun. 2015, discloses ascorbic acid as a chelating agent to bind metal ions in a fracturing fluid system. U.S. Pat. No. 4,752,404, issued to Burns et al. on 21 Jun. 1988, teaches blends of water soluble polymers with ascorbic acid as a stabilizer or sequestering agent. U.S. Pat. No. 7,833,949, issued to Li et al. on 16 Nov. 2010, describes another fracturing fluid system with a polysaccharide having ascorbic acid mentioned as a possible reducing agent. U.S. Pat. No. 7,678,745, issued to Parris et al. on 16 Mar. 2010, discloses a fracturing fluid system with an organic peroxide, including a side note mentioning ascorbic acid as a stabilizer.

It is an object of the present invention to provide a method for well stimulation by hydraulic fracturing a rock formation through a wellbore under high temperature conditions.

It is another object of the present invention to provide a method for hydraulic fracturing a rock formation at a temperature range of 150-260 degrees Celsius.

It is an object of the present invention to provide a method for well stimulation by hydraulic fracturing, wherein the fracturing fluid system has ascorbic acid as a stabilizer.

It is another object of the present invention to provide a method for well stimulation by hydraulic fracturing with a gel based fracturing fluid system having viscosity stabilized by ascorbic acid.

It is an object of the present invention to provide a method for well stimulation by hydraulic fracturing with a fracturing fluid system having a high molecular weight synthetic polymer as the gelling agent.

It is an object of the present invention to provide a method for well stimulation by hydraulic fracturing, wherein the fracturing fluid system has ascorbic acid as a stabilizer and a pH adjusting agent.

It is another object of the present invention to provide a method for well stimulation by hydraulic fracturing, wherein the fracturing fluid system with delayed cross-linking has ascorbic acid as a stabilizer, and a pH adjusting agent.

It is still another object of the present invention to provide a method for well stimulation by hydraulic fracturing, wherein the fracturing fluid system has ascorbic acid as a stabilizer and a pH adjusting agent, and another pH adjusting agent adjusted according to the amount of ascorbic acid and other additives.

It is an object of the present invention to provide a method for well stimulation by hydraulic fracturing under high temperature conditions by injecting a stable fracturing fluid system having a biologically friendly stabilizer.

It is another object of the present invention to provide a method for well stimulation by hydraulic fracturing under high temperature conditions by injecting a stable well treatment fluid having a stabilizer with less risk of environmental contamination.

These and other objectives and advantages of the present invention will become apparent from a reading of the attached specification.

BRIEF SUMMARY OF THE INVENTION

Embodiments of the present invention include a method for well-stimulation through a wellbore in a rock formation, such as hydraulic fracturing. The method can include the steps of: injecting a fracturing fluid system to the rock formation; fracturing the rock formation at a temperature between 150-260 degrees Celsius; and recovering fluid components of the fracturing fluid system from the wellbore. The fracturing fluid system comprises a proppant, and a plurality of fluid components. The fluid components can be comprised of water, a gelling agent, and a stabilizer comprised of ascorbic acid. The proppant is a granular material, which prevents fractures from closing, after the step of injecting. The gelling agent can be a high molecular weight synthetic polymer resistant to hydrolysis. For some embodiments, the fracturing fluid system further comprises a cross linking agent to increase viscosity of the fracturing fluid system, an inverting surfactant to hydrate the emulsion polymer in water, and breaker to facilitate the step of recovering fluid components of the fracturing fluid system. The cross linking agent can increases viscosity of the fracturing fluid system by cross linking the gelling agent with metal ions. Other fluid components can include sodium thiosulfate.

In the embodiments of the present invention, the ascorbic acid adjusts pH of the fracturing fluid system, the other fluid components, even before addition of a cross linking agent, having a pH ranging from about 3.5 to 6.9. Additionally, there can be another pH adjusting agent added to the fracturing fluid system after the stabilizer. Other additives can affect the pH, so pH may need to be adjusted after the stabilizer. The amount of the other pH adjusting agent is adjusted to maintain pH ranging from about 3.5 to 6.9, after the amount of ascorbic acid is set. The ascorbic acid can delay cross linking of the gelling agent and prevent strong cross linking, such that there is no spike in apparent viscosity at the beginning of addition to the fracturing fluid system. Within the temperature range of 150-260 degrees Celsius, the ascorbic acid stabilizes apparent viscosity so that the fracturing fluid system can deliver the proppant to the fractures.

DETAILED DESCRIPTION OF THE INVENTION

Figure 1:
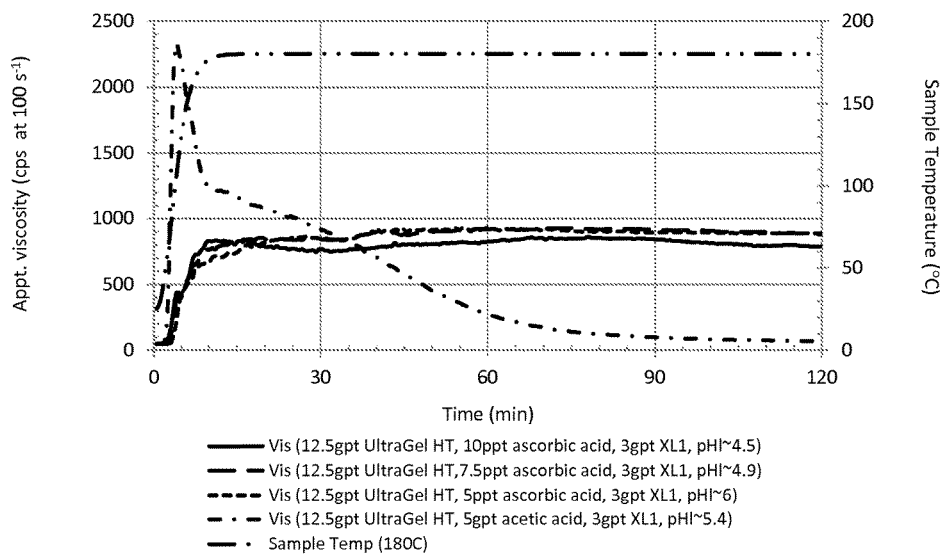
FIG. 1 is a graph illustration of rheological profiles of fracturing fluid systems at 180 degrees Celsius, showing embodiments of fracturing fluid systems of the method of the present invention.

A method for well-stimulation through a wellbore in a rock formation includes hydraulic fracturing. Conventional methods use fracturing fluid systems to create fractures and to deliver proppant to the fractures. There can be additives to water based fracturing fluid systems for suspending proppant or pumping at a particular velocity. At high temperatures, the conventional fracturing fluid systems break down. For example, known gelling agents are polysaccharides, such as guar gum, which increase viscosity to suspend proppant. However, these conventional fracturing fluid systems degrade under high temperature conditions. Guar gum degrades too much under the conditions in deeper wells. The conventional fracturing fluid systems cannot function effectively at the depths of current deep wells. In the present invention, the method injects a fracturing fluid system, which is stable under high temperature conditions.

Embodiments of the method of the present invention includes injecting a fracturing fluid system into the rock formation, fracturing the rock formation at a temperature between 150-260 degrees Celsius, and recovering the fluid components of the fracturing fluid system from the wellbore. The proppant is carried to the fractures, and most proppant remains lodged in the fracture. The fracturing fluid system comprises the proppant, and a plurality of fluid components. The fluid components can include water, a gelling agent, and a stabilizer of ascorbic acid. The proppant can be comprised of a granular material to prevent fractures from closing, such as silica, bauxite, and ceramics.

Under high temperature conditions, the gelling agent is comprised of a high molecular weight synthetic polymer resistant to hydrolysis. The carbon-carbon backbone is more resistant to hydrolysis. In some embodiments, the gelling agent is comprised of a copolymer derived from acrylamide, 2-Acrylamido-2-methylpropane sulfonic acid (AMPS), and vinyl phosphonate. Even with the carbon-carbon backbone, the fracturing fluid system requires more additives in order to remain functional as a fracturing fluid system in high temperature conditions. A cross linking agent can be added to increase viscosity of the fracturing fluid system. The method of the invention includes cross linking the gelling agent, such as cross linking the gelling agent with metal ions of a cross linking agent. For a gelling agent comprised of a high molecular weight synthetic polymer, a cross linking agent can be selected from zirconium based compounds and titanium based compounds.

An inverting surfactant can be added to hydrate the emulsion polymer in the water, when the gelling agent is comprised of an emulsion polymer. Another fluid component can be a breaker. At relatively low temperatures, a breaker has been used to oxidize a fracturing fluid system so that the fluid components can be more easily recovered from the fractures. After the proppant is delivered, the step of recovering requires the fracturing fluid system to be removed from the rock formation. In the present invention at high temperatures, a breaker, such as sodium bromated, can be used to break the fracturing fluid system in a controlled manner. The timing and depth of loading the breaker can be controlled. Oxidizing breakers, such as sodium bromated and peroxides can be used, and the breakers may also be encapsulated for additional control of the release of the breaker into the fracturing fluid system. Another fluid component can be sodium thiosulfate, as a second stabilizer in the fracturing fluid system. The temperature of the rock formation and the duration of exposure to the high temperature determine the amount of water, the gelling agent, such as a high molecular weight synthetic copolymer, stabilizer of ascorbic acid, and other fluid components and additives. Furthermore, the well conditions and the type of treatment can affect particular amounts.

Embodiments of the present invention include injecting a fracturing fluid system with the ascorbic acid as a stabilizer. The present invention includes forming the ascorbic acid by loading an ascorbate salt and an acid or loading ascorbic acid directly into the fracturing fluid system. As an acid, the amount of ascorbic acid adjusts the fluid system, such as adjusting to a pH ranging from about 3.5 to 6.9, when the fluid system is a linear gel before a cross linking agent is added. In other embodiments, the fracturing fluid system further comprises a pH adjusting agent as a second adjustment to the pH added to the fracturing fluid system after the stabilizer. The second pH adjusting agent can also maintain the fracturing fluid system in a range of about 3.5 to 6.9 as a linear gel, before cross linking. In particular, the range can be 4.5 to 6.0 with the second pH adjusting agent. Other additives, such as the cross-linking agent, will affect the pH such that the pH adjusting agent may be needed in addition to the ascorbic acid already added as a stabilizer.

The ascorbic acid of the fracturing fluid system also delays cross linking of the gelling agent. When added to the fracturing fluid system with a cross linking agent, the start of the cross-linking is delayed, and the gelling agent increases in apparent viscosity without a spike. The apparent viscosity is stabilized within a temperature range of 150-260 degrees Celsius. The method of the present invention includes adding a cross linking agent to the fracturing fluid system and cross linking the gelling agent from a linear gel at a pre-set depth in the wellbore, after the step of delaying cross linking with ascorbic acid. Furthermore, the method includes adjusting the amount ascorbic acid in the fracturing fluid system so as to control the amount of delay. The amount of time delaying cross linking can be regulated by the present invention. The apparent viscosity can be increased at the target lower depth in the wellbore, not so early, when the fracturing fluid system is still being pumped to the target lower depth. High shear from pumping would degrade the fracturing fluid system too much before reaching the new deeper wells. The embodiments of the present invention include injecting a fracturing fluid system with ascorbic acid ranging from 1-50 ppt and 3-25 ppt so as to adjust pH and delay the cross linking agent.

EXAMPLE 1

Figure 2:
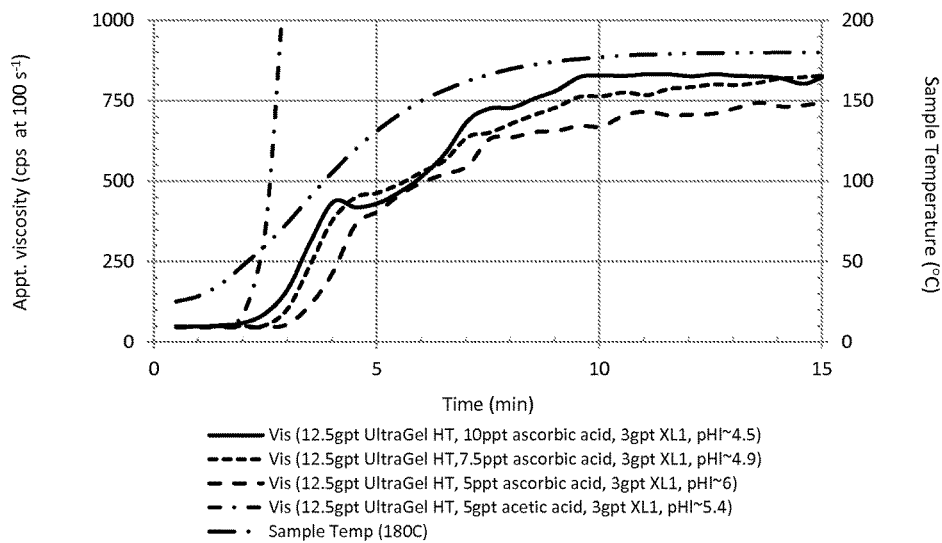
FIG. 2 is a graph illustration of the rheological profiles of the fracturing fluid systems of FIG. 1, showing the first 15 minutes of FIG. 1, wherein the start of cross linking is delayed, and wherein delay time decreases with increasing loading of ascorbic acid.

FIGS. 1 and 2 show embodiments of the present invention at 180 degrees Celsius. FIG. 1 shows rheological properties over 2 hours after injecting, and FIG. 2 shows rheological properties over an isolated 15 minutes after injecting.

Test samples include fracturing fluid systems comprised of UltraGel HT (TM), which is a copolymer of acrylamide, 2-Acrylamido-2-methylpropane sulfonic acid (AMPS), and vinyl phosphonate, as the gelling agent, an inverting surfactant, ascorbic acid as the stabilizer, and a zirconium-based cross linking agent (XL1). An alternate test sample includes acetic acid as the pH adjusting agent, instead of ascorbic acid.

A first test sample has 12.5 gal/1000 gal of gelling agent, 10 lb/1000 gal of ascorbic acid, and 3 gal/1000 gal of cross linking agent. A second test sample has 12.5 gal/1000 gal of gelling agent, 7.5 lb/1000 gal of ascorbic acid, and 3 gal/1000 gal of cross linking agent. A third test sample has 12.5 gal/1000 gal of gelling agent, 5 lb/1000 gal of ascorbic acid, and 3 gal/1000 gal of cross linking agent. The alternate test sample has 12.5 gal/1000 gal of gelling agent, 5 lb/1000 gal of acetic acid, and 3 gal/1000 gal of cross linking agent. The temperature of the test samples are superimposed in FIGS. 1 and 2 to show the high temperature conditions.

FIGS. 1 and 2 contrast the alternative test sample and the first, second, and third test samples. The apparent viscosity of the prior art acetic acid as a pH adjusting agent spikes. By replacing acetic acid with ascorbic acid, the apparent viscosity of the fracturing fluid system is more leveled. There is no spike at the beginning, and the apparent viscosity maintains much higher values over 2 hrs, even at the elevated temperature. Furthermore, the start of cross linking is further delayed. With ascorbic acid, the cross linking persists longer under the elevated temperature conditions. FIGS. 1 and 2 also show injecting a fracturing fluid system without an additional pH adjusting agent. The ascorbic acid was sufficient as a pH adjusting agent in the first and second test samples. Therefore, ascorbic acid functions as an acidic adjusting agent, a gel stabilizer and a cross linking control agent. Much more simplified fluid systems with greatly improved high temperature rheological performance were obtained using the method of the present invention.

EXAMPLE 2

Figure 3:
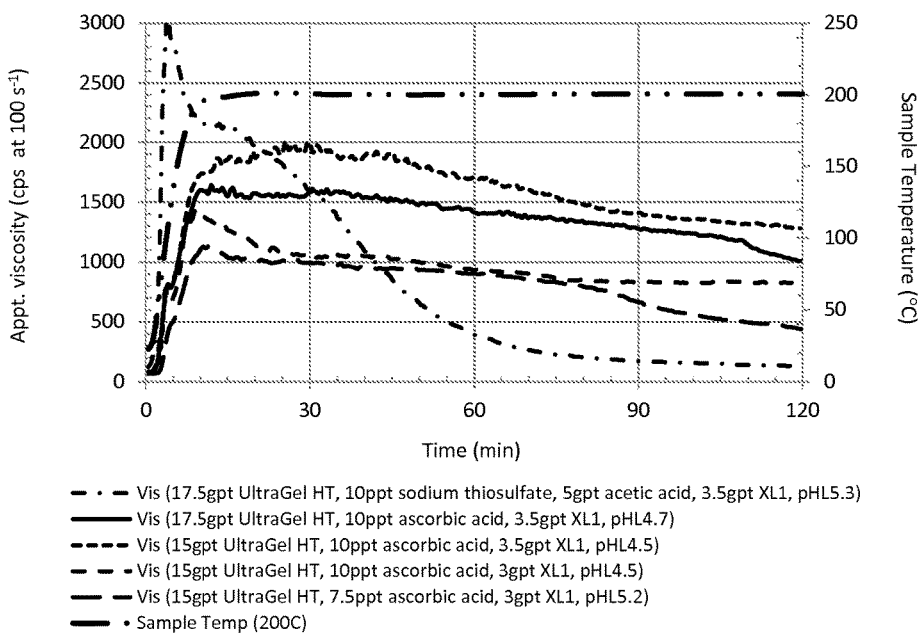
FIG. 3 is a graph illustration of rheological profiles of fracturing fluid systems at 200 degrees Celsius, showing embodiments of fracturing fluid systems of the method of the present invention.
Figure 4:
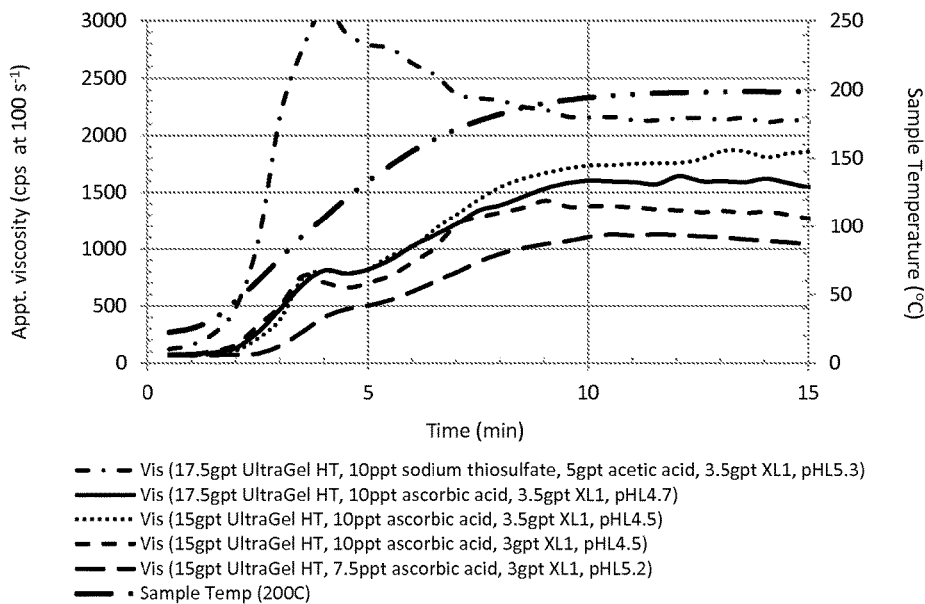
FIG. 4 is a graph illustration of the rheological profiles of the fracturing fluid systems of FIG. 3, showing the first 15 minutes of FIG. 3, wherein the start of cross linking is delayed, and wherein delay time decreases with increasing loading of ascorbic acid.

FIGS. 3 and 4 show embodiments of the present invention at 200 degrees Celsius. FIG. 3 shows rheological properties over 2 hours after injecting, and FIG. 4 shows rheological properties over an isolated 15 minutes after injecting. Example 2 shows the durability of the invention in the range of higher temperatures as 200 degrees Celsius.

Test samples include fracturing fluid systems comprised of UltraGel HT (TM), which is a copolymer of acrylamide, AMPS, and vinyl phosphonate, as the gelling agent, an inverting surfactant, ascorbic acid as the stabilizer, and a zirconium-based cross linking agent (XL1). An alternate test sample includes sodium thiosulfate as the stabilizer and acetic acid as the pH adjusting agent, instead of ascorbic acid.

A first test sample has 17.5 gal/1000 gal of gelling agent, 10 lb/1000 gal of ascorbic acid, and 3.5 gal/1000 gal of cross linking agent. A second test sample has 15 gal/1000 gal of gelling agent, 10 lb/1000 gal of ascorbic acid, and 3.5 gal/1000 gal of cross linking agent. A third test sample has 15 gal/1000 gal of gelling agent, 10 lb/1000 gal of ascorbic acid, and 3 gal/1000 gal of cross linking agent. A fourth test sample has 15 gal/1000 gal of gelling agent, 7.5 lb/1000 gal of ascorbic acid, and 3 gal/1000 gal of cross linking agent. The alternate test sample has 17.5 gal/1000 gal of gelling agent, 10 lb/1000 gal of sodium thiosulfate, 5 gal/1000 gal of acetic acid, and 3.5 gal/1000 gal of cross linking agent. The temperature of the test samples are superimposed in FIGS. 3 and 4 to show the high temperature conditions at 200 degrees Celsius.

FIGS. 3 and 4 contrast the alternative test sample and the first test sample. The prior art sodium thiosulfate as stabilizer and acetic acid as a pH adjusting agent spikes. By replacing the sodium thiosulfate and acetic acid with ascorbic acid, the apparent viscosity of the fracturing fluid system remained more leveled. The damping continues at 200 degrees Celsius, and the apparent viscosity maintains much higher values over 2 hrs. Furthermore, four test samples show the delayed cross linking by the ascorbic acid of the present invention. FIG. 4 shows the delayed start time for the cross linking by the ascorbic acid. With ascorbic acid, the cross-linking continues to persist longer under the elevated temperature conditions. FIGS. 3 and 4 further support injecting a fracturing fluid system without an additional pH adjusting agent. The ascorbic acid was sufficient as a pH adjusting agent in the first through fourth test samples. Under an additional high temperature condition, ascorbic acid functions as an acidic adjusting agent, a gel stabilizer and a cross-linking control agent.

EXAMPLE 3

Figure 5:
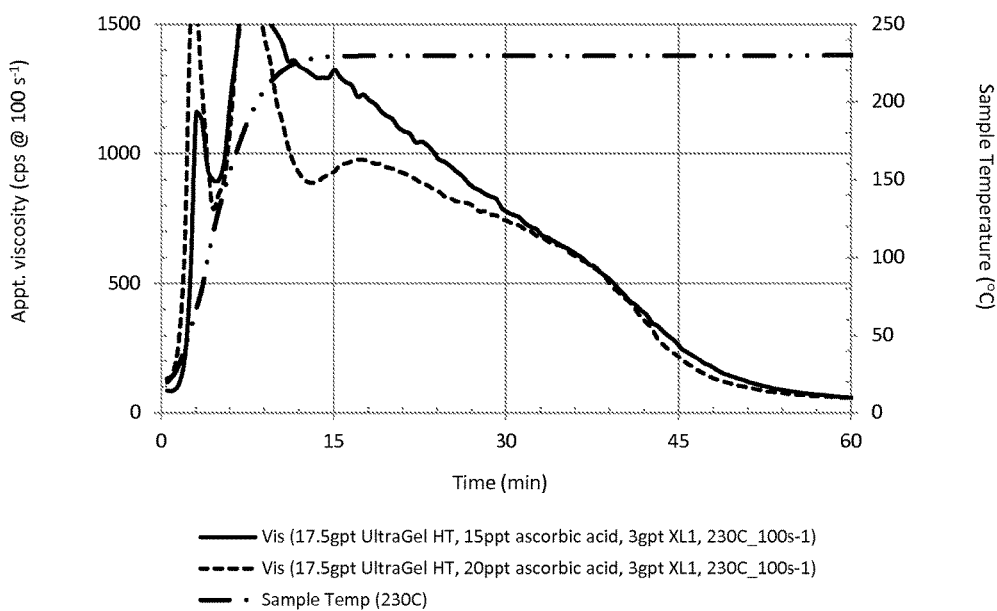
FIG. 5 is a graph illustration of rheological profiles of fracturing fluid systems at 230 degrees Celsius, showing embodiments of fracturing fluid systems of the method of the present invention.

FIG. 5 show embodiments of the present invention at 230 degrees Celsius. FIG. 5 shows rheological properties over 1 hour after injecting. Example 3 shows the embodiment at another higher temperature in the range of higher temperatures.

Test samples include fracturing fluid systems comprised of UltraGel HT (TM), which is a copolymer of acrylamide, AMPS, and vinyl phosphonate, as the gelling agent, an inverting surfactant, ascorbic acid as the stabilizer, and a zirconium-based cross linking agent (XL1).

A first test sample has 17.5 gal/1000 gal of gelling agent, 15 lb/1000 gal of ascorbic acid, 3 gal/1000 gal of cross linking agent, and 3 gal/1000 gal of inverting surfactant. A second test sample has 17.5 gal/1000 gal of gelling agent, 20 lb/1000 gal of ascorbic acid, 3 gal/1000 gal of cross linking agent, and 3 gal/1000 gal of inverting surfactant. The temperature of the test samples are superimposed in FIG. 5 to show the high temperature conditions at 230 degrees Celsius.

FIG. 5 also shows the delayed cross linking by the ascorbic acid of the present invention and the delayed start time for the cross linking by the ascorbic acid, similar to the Examples at 180 degrees Celsius and 200 degrees Celsius. With ascorbic acid, the cross-linking continues to persist longer under still another elevated temperature condition.

The damping continues at 230 degrees Celsius, and the apparent viscosity maintains much higher values over 2 hrs.

EXAMPLE 4

Figure 6:
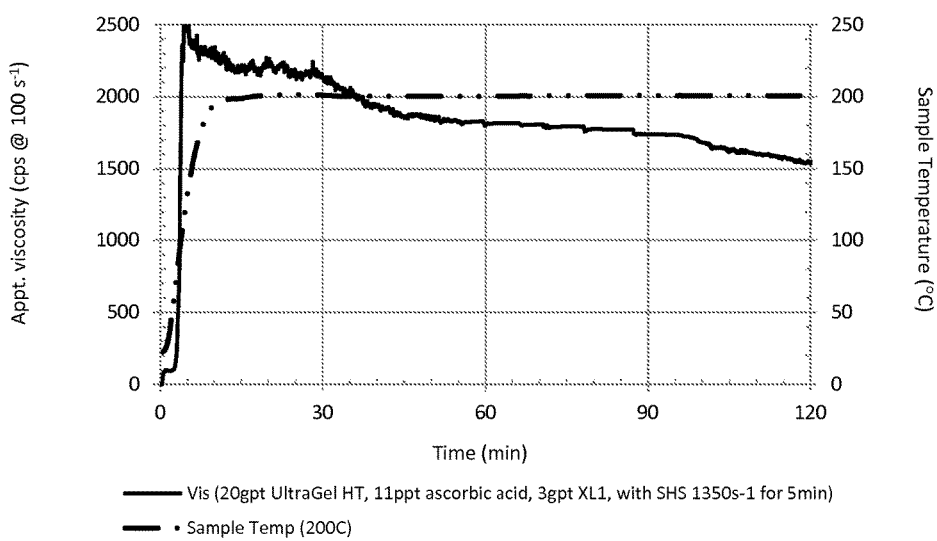
FIG. 6 is a graph illustration of rheological profiles of fracturing fluid systems at 200 degrees Celsius, after shear history simulation at 1350 $s^{-1}$ for five minutes, showing an embodiment of a fracturing fluid system of the method of the present invention.

FIG. 6 show embodiments of the present invention at 200 degrees Celsius. FIG. 6 shows rheological properties over 2 hours after injecting. Example 4 shows the embodiment with shear history simulation in the range of higher temperatures.

Test samples include fracturing fluid systems comprised of UltraGel HT (TM), which is a copolymer of acrylamide, AMPS, and vinyl phosphonate, as the gelling agent, ascorbic acid as the stabilizer, a zirconium-based cross linking agent (XL1), and an inverting surfactant with a shear history simulation at 1350 s$^{-1}$, indicated as "SHS 1350 s-1".

A first test sample has 20 gal/1000 gal of gelling agent, 11 lb/1000 gal of ascorbic acid, 3 gal/1000 gal of cross linking agent, and 3 gal/1000 gal of inverting surfactant. The temperature of the test sample is superimposed in FIG. 6 to show the high temperature conditions at 200 degrees Celsius.

FIG. 6 shows the high shear stability of the fracturing fluid system for the method of the present invention. When used in the field, a fracturing fluid system experiences a much higher shear before entering fractures than the shear in a lab rotation viscometer. The high shear can have a detrimental effect on the downhole performance of the fluid. FIG. 6 shows a simulation of a fracturing fluid system closer to actual field conditions, wherein the rheological properties are suitable for fracturing. FIG. 6 shows that injecting a fracturing fluid system in conditions at high sheer is possible with the method of the present invention.

EXAMPLE 5

Figure 7:
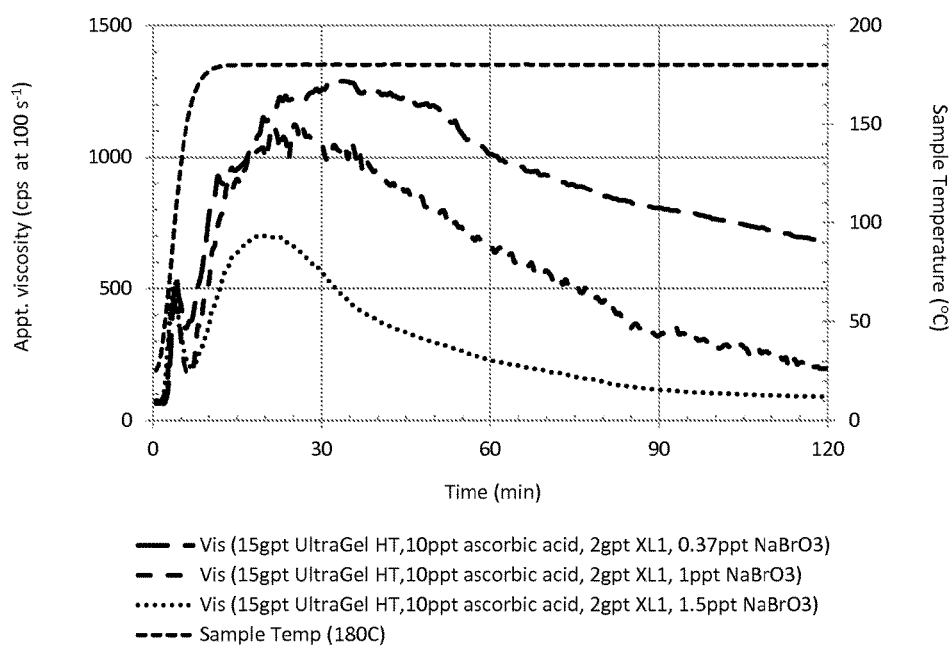
FIG. 7 is a graph illustration of rheological profiles of fracturing fluid systems at 180 degrees Celsius, showing embodiments of fracturing fluid systems of the method of the present invention, when the fracturing fluid systems include a breaker as a fluid component.

FIG. 7 show embodiments of the present invention at 180 degrees Celsius. FIG. 7 shows rheological properties over 2 hours after injecting. Example 5 shows the embodiment with breaker in the range of higher temperatures.

Test samples include fracturing fluid systems comprised of UltraGel HT (TM), which is a copolymer of acrylamide, AMPS, and vinyl phosphonate, as the gelling agent, an inverting surfactant, ascorbic acid as the stabilizer, a zirconium-based cross linking agent (XL1), and a breaker of sodium bromated (NaBrO3).

A first test sample has 15 gal/1000 gal of gelling agent, 10 lb/1000 gal of ascorbic acid, 2 gal/1000 gal of cross linking agent, 3 gal/1000 gal of inverting surfactant, and 0.37 ppt NaBrO3. A second test sample has 15 gal/1000 gal of gelling agent, 10 lb/1000 gal of ascorbic acid, 2 gal/1000 gal of cross linking agent, 3 gal/1000 gal of inverting surfactant, and 1 ppt NaBrO3. A third test sample has 15 gal/1000 gal of gelling agent, 10 lb/1000 gal of ascorbic acid, 2 gal/1000 gal of cross linking agent, 3 gal/1000 gal of inverting surfactant, and 1.5 ppt NaBrO3.

The temperature of the test sample is superimposed in FIG. 7 to show the high temperature conditions at 180 degrees Celsius.

FIG. 7 shows the fracturing fluid systems holding the stability of the apparent viscosity with the breaker. The ascorbic acid continues to delay the cross linking, and any spike in viscosity remains reduced. FIG. 7 shows functionality of the fluid system in the higher temperature of the present invention with a breaker. In the field, a breaker can still be used at the high temperature range in a controlled manner to recover fluid components, after the step of fracturing.

The present invention provides a method for well stimulation by hydraulic fracturing a rock formation through a wellbore under high temperature conditions. Conventional fracturing fluid systems break down and require multiple additives to maintain functionality as a fracturing fluid system. The present invention is a method for hydraulic fracturing a rock formation in a high temperature range, such as 150-260 degrees Celsius. The method includes a fracturing fluid system that remains stable without breaking down. The viscosity of the gel based fracturing fluid system withstands high shear during pumping and the elevated temperatures of downhole conditions. In addition to a high molecular weight synthetic polymer as the gelling agent, the fracturing fluid system includes ascorbic acid as a stabilizer and pH adjusting agent. The gel is stabilized without spikes in apparent viscosity, and there is delayed cross linking. Depending on the wellbore conditions, delayed cross linking of fracturing fluid systems is important, especially for deep wells. With deep wells, the time for the fracturing fluid systems to reach the bottom of the wellbore and the fractures can be very long, and the fracturing fluid systems need to be cross linked to gain significant viscosity to carry proppant into the fractures at this deep location. Without a delay in cross linking, the fracturing fluid systems would be damaged mechanically when pumped downhole at high rates, especially for metal-ion cross-linked fracturing fluid systems. Therefore, controlled delay of the cross linking is a critical advantage of the fracturing fluid systems of the present invention. The present invention supports that the addition of ascorbic acid provides controlled delay of the cross linking and that the delay time is adjusted by loading of the ascorbic acid. The apparent viscosity avoids spikes with the addition of the stabilizer of the present invention and continues to maintain functionality with apparent viscosity after injecting.

Embodiments of the present invention show that ascorbic acid as a stabilizer is compatible with other fluid components, such as cross linking agents, inverting surfactants used with emulsion polymers as the gelling agent, and breakers. In the field, the method of the present invention is compatible with the fluid components for addressing different fracturing conditions in the formation. The performance of the fracturing fluid system with ascorbic acid is confirmed by the test results and data.

In the present invention, the amount of ascorbic acid can keep the fracturing fluid system at a pH ranging from about 3.5 to 6.9, such as the fracturing fluid system being a linear gel before adding the cross linking agent. An additional pH adjusting agent is not always required in the fracturing fluid system. In other embodiments, there can be a need for a pH adjusting agent as a second adjustment to the pH added to the fracturing fluid system after the stabilizer of the present invention. Other additives, such as the cross linking agent, will affect the pH such that the pH adjusting agent may be needed in addition to the ascorbic acid as stabilizer. When the pH is not within the range of 3.5 to 6.9, an additional pH adjusting agent can be added. Unlike the prior art, this secondary pH adjusting agent is adjusted according to the amount of stabilizer, the ascorbic acid, and the other additives. Other pH adjusting agents are not added at the rate and conditions of the fluid system of the present invention.

The present invention further provides injecting a fracturing fluid system that is biologically friendly and carries less risk of environmental contamination. Ascorbic acid is a naturally occurring compound, which has not been used in the method of the present invention. The problems of other stabilizers, like phenothiazine and sodium thiosulfate are avoided without compromising the functionality of the fracturing fluid. The solubility of the ascorbic acid as stabilizer does not require a special solvent with risk to the environment.

In the present invention, it is possible for a copolymer of acrylamide, AMPS, and vinyl phosphonate to function as a gelling agent beyond the conventional polysaccharides, like guar gum. Beyond the known applications with a high molecular weight copolymer, the present invention includes injecting with ascorbic acid as a gel thermal stabilizer, a pH adjusting agent, and a cross linking delay agent. The known gel thermal stabilizers, such as sodium thiosulfate, are generally oxygen scavengers for the conventional fracturing fluid systems. In high temperature conditions, ascorbic acid has not been disclosed as an additive for these specialized fracturing fluid systems. The present invention includes a method of fracturing with ascorbic acid in a new fracturing fluid system for conditions previously unrealized with the level of drilling technology.

The foregoing disclosure and description of the invention is illustrative and explanatory thereof. Various changes in the details of the illustrated structures, construction and method can be made without departing from the true spirit of the invention.

The invention claimed is:

1. A method for well-stimulation through a wellbore in a rock formation, comprising the steps of:
    injecting a fracturing fluid system to said rock formation, said fracturing fluid system comprising:
        a proppant; and a plurality of fluid components, said fluid components being comprised of:
            water;
            a gelling agent;
            a cross linking agent; and
            a stabilizer comprising ascorbic acid;
    fracturing said rock formation at a temperature between 150-260 degrees Celsius;
    adjusting pH of said fracturing fluid system with said ascorbic acid, said fracturing fluid system having a pH ranging from about 3.5 to 6.9 as a linear gel before adding said cross linking agent to said fracturing fluid system;
    cross linking said gelling agent with said cross linking agent so as to increase viscosity of said fracturing fluid system;
    delaying said cross linking of said gelling, agent with said ascorbic acid; and
    recovering said fluid components of said fracturing fluid system from said wellbore, wherein the ascorbic acid is present as a fluid component of the fracturing fluid in a range of from about 1 ppt to about 50 ppt so as to adjust pH and delay cross linking of said gelling agent.

2. The method for well-stimulation, according to claim 1, wherein said proppant is comprised of a granular material to prevent fractures from closing.

3. The method for well-stimulation, according to claim 1, wherein said gelling agent is comprised of a high molecular weight synthetic polymer resistant to hydrolysis.

4. The method for well-stimulation, according to claim 3, wherein said fracturing fluid system further comprises an inverting surfactant to hydrate the polymer in said water, the polymer being an emulsion polymer.

5. The method for well-stimulation, according to claim 1, wherein said gelling agent is comprised of a copolymer derived from acrylamide, acrylamidomethylpropanesulfonic acid, and vinyl phosphonate.

6. The method for well-stimulation, according to claim 1, wherein said cross linking agent is selected from at least one of a group consisting of boron based compounds, zirconium based compounds, and titanium based compounds.

7. The method for well-stimulation, according to claim 1, wherein said fracturing fluid system further comprises a breaker, and wherein the step of recovering said fluid components comprises loading said breaker into said fracturing fluid system, after the step of fracturing.

8. The method for well-stimulation, according to claim 1, wherein the step of injecting said fracturing fluid system comprises: forming said ascorbic acid in said fracturing fluid system by loading an ascorbate salt and an acid into said fracturing fluid system.

9. The method for well-simulation, according to claim 1, wherein said ascorbic acid ranges from about 3 ppt to about 25 ppt so as to adjust pH and delay said cross linking agent.

10. The method for well-stimulation, according to claim 9, wherein said pH adjusting agent maintains said fracturing fluid system in a range of about 3.5 to about 6.9 as a linear gel.

11. A method for well-stimulation through a wellbore in a rock formation, comprising the steps of:
    injecting a fracturing fluid system to said rock formation, said fracturing fluid system comprising:
        a proppant; and a plurality of fluid components, said fluid components being comprised of:
            water;
            a gelling agent;
            a cross linking agent; and
            a stabilizer comprising ascorbic acid;
    adjusting pH of said fracturing fluid system with ascorbic acid, said fracturing fluid system having a pH in a range of from about 3.5 to about 6.9 as a linear gel before adding said cross linking agent to said fracturing fluid system;
    fracturing, said rock formation at a temperature between 150-260 degrees Celsius;
    cross linking said gelling agent with said cross linking agent so as to increase viscosity of said fracturing fluid system without a spike in apparent viscosity;
    delaying said cross linking of said gelling agent with said ascorbic acid; and
    recovering said fluid components of said fracturing fluid system from said wellbore, wherein the ascorbic acid is present as a fluid component of the fracturing fluid in a range of from about 1 ppt to about 50 ppt so as to adjust pH and delay cross linking of said gelling agent.

\* \* \* \* \*